US012652084B2

(12) United States Patent
Shah et al.

(10) Patent No.: US 12,652,084 B2
(45) Date of Patent: Jun. 9, 2026

(54) TECHNIQUES FOR ORTHOGONAL COVER CODING WITH TRANSPORT BLOCKS OVER MULTIPLE SLOTS AND RESOURCE UNIT ALLOCATION

(71) Applicant: QUALCOMM Incorporated, San Diego, CA (US)

(72) Inventors: Syed Hashim Ali Shah, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/793,566

(22) Filed: Aug. 2, 2024

(65) Prior Publication Data

US 2026/0039337 A1 Feb. 5, 2026

(51) Int. Cl.
 H04L 23/02 (2006.01)
 H04B 7/0452 (2017.01)
 H04L 5/00 (2006.01)
(52) U.S. Cl.
 CPC ......... H04B 7/0452 (2013.01); H04L 5/0051 (2013.01); H04L 5/0055 (2013.01)
(58) Field of Classification Search
 CPC ... H04L 5/0053; H04L 5/0023; H04L 5/0016; H04L 27/26; H04B 7/0452; H04B 7/0413; H04B 7/0697; H04W 72/1268; H04W 88/08; H04W 72/044
 USPC .................................. 375/262, 260, 267, 299
 See application file for complete search history.

(56) References Cited

U.S. PATENT DOCUMENTS

| | | | | |
|---|---|---|---|---|
| 2012/0140716 A1* | 6/2012 | Baldemair | .............. | H04J 13/18 |
| | | | | 370/329 |
| 2019/0229869 A1* | 7/2019 | Li | .......................... | H04L 27/261 |
| 2019/0289628 A1* | 9/2019 | Xiong | .................. | H04W 52/365 |
| 2022/0123885 A1* | 4/2022 | Shin | .................. | H04W 72/0446 |
| 2022/0200736 A1* | 6/2022 | Cirik | ..................... | H04L 1/1819 |

FOREIGN PATENT DOCUMENTS

WO WO-2023150411 A1 8/2023

OTHER PUBLICATIONS

International Search Report and Written Opinion PCT/US2025/038478 ISA/EPO Nov. 26, 2025.

(Continued)

*Primary Examiner* — Khai Tran
(74) *Attorney, Agent, or Firm* — Holland & Hart LLP

(57) ABSTRACT

Methods, systems, and devices for wireless communications are described. A user equipment (UE) may receive control signaling that indicates an orthogonal cover coding (OCC) codeword assigned to the UE and an OCC factor. The UE may receive an uplink grant that allocates, to the UE, uplink resources over a series of uplink time units for a quantity of repetitions of a transmission block. The UE may subsequently use the assigned OCC codeword to transmit each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor.

20 Claims, 12 Drawing Sheets

(56) References Cited

OTHER PUBLICATIONS

Lowenmark S.E (Ericsson)., et al., "On Uplink Capacity/throughput Enhancement for NR NTN", 3GPP TSG-RAN WG1 Meeting #117, R1-2404418, Type Discussion, NR_NTN_PH3-CORE, 3rd Generation Partnership Project (3GPP), Mobile Competence Centre, 650, Route Des Lucioles, F-06921 Sophia-Antipolis Cedex, France, vol. RAN WG1, No. Fukuoka City, Fukuoka, JP, May 20, 2024-May 24, 2024, May 10, 2024, 25 Pages, XP052608716, p. 7-p. 8.

Salim U (Interdigital, Inc.)., et al., "NR-NTN Uplink Capacity/ throughput Enhancement", 3GPP TSG RAN WG1 #117, R1-2404263, Type Discussion, NR_NTN_PH3-CORE, 3rd Generation Partnership Project (3GPP), Mobile Competence Centre, 650, Route Des Lucioles, F-06921 Sophia-Antipolis Cedex, France, vol. RAN WG1, No. Fukuoka City, Fukuoka, JP, May 20, 2024-May 10, 2024, May 10, 2024, 9 Pages, XP052608569, pp. 3, 4, 7.

Zeng W (Apple)., et al., "Discussion on NR-NTN Uplink Capacity Enhancement", 3GPP TSG RAN WG1 #117, R1-2404309, Type Discussion, NR_NTN_PH3-CORE, 3rd Generation Partnership Project (3GPP), Mobile Competence Centre, 650, Route Des Lucioles, F-06921 Sophia-Antipolis Cedex, France, vol. RAN WG1, No. Fukuoka City, Fukuoka, JP, May 20, 2024-May 24, 2024, May 10, 2024, 8 Pages, XP052608609, p. 4.

Zeng W (Apple)., et al., "On IoT-NTN Uplink Capacity Enhancement", 3GPP TSG RAN WG1 #116-bis, R1-2402905, Type Discussion, IOT_NTN_PH3-CORE, 3rd Generation Partnership Project (3GPP), Mobile Competence Centre, 650, Route Des Lucioles, F-06921 Sophia-Antipolis Cedex, France, vol. RAN WG1, No. Changsha, Hunan Province, CN, Apr. 15, 2024-Apr. 19, 2024, Apr. 5, 2024, 6 Pages, XP052586892, p. 1-p. 5.

Zuo Z (OPPO)., et al., "Discussion on IoT-NTN Uplink Capacity/ throughput Enhancement", 3GPP TSG RAN WG1 #117, R1-2404864, Type Discussion, IOT_NTN_PH3-CORE, 3rd Generation Partnership Project (3GPP), Mobile Competence Centre, 650, Route Des Lucioles, F-06921 Sophia-Antipolis Cedex, France, vol. RAN WG1, No. Fukuoka City, Fukuoka, JP, May 20, 2024-May 24, 2024, May 10, 2024, 8 Pages, XP052609147, p. 1-p. 2.

* cited by examiner 115-c 105-c

605 — Capability report

Select OCC parameters
610

Indication of OCC codeword and parameters
615

Uplink grant
620

625 — Transmission of reps over quantity of time units

600

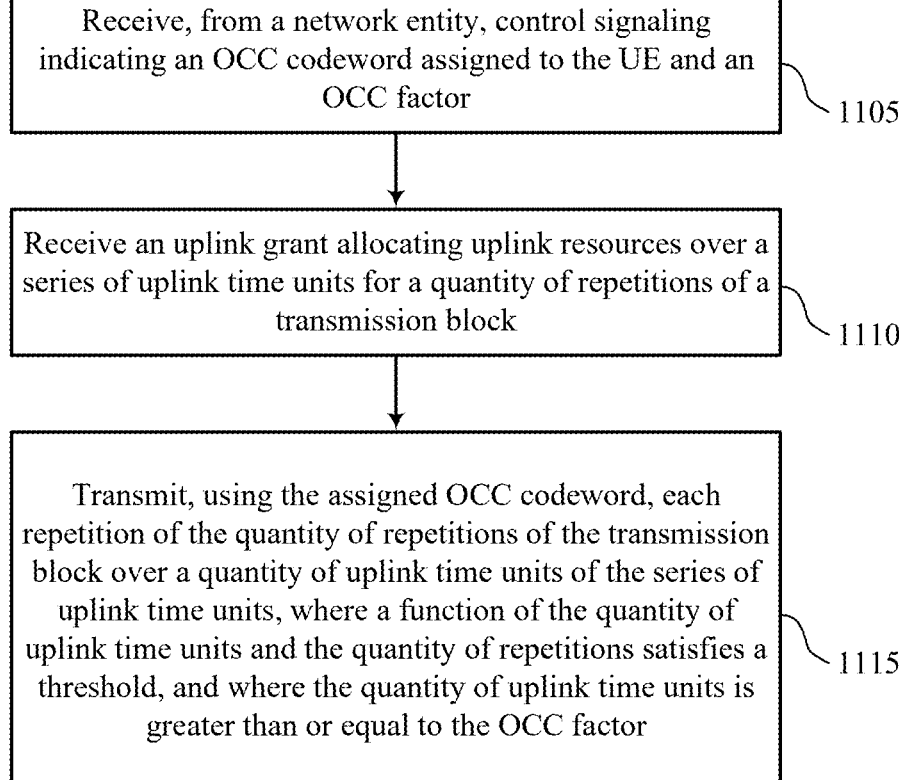

Receive, from a network entity, control signaling indicating an OCC codeword assigned to the UE and an OCC factor

1105

Receive an uplink grant allocating uplink resources over a series of uplink time units for a quantity of repetitions of a transmission block

1110

Transmit, using the assigned OCC codeword, each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor

TECHNIQUES FOR ORTHOGONAL COVER CODING WITH TRANSPORT BLOCKS OVER MULTIPLE SLOTS AND RESOURCE UNIT ALLOCATION

FIELD OF TECHNOLOGY

The present disclosure relates to wireless communications, including techniques for orthogonal cover coding (OCC) with transport block over multiple slots (TBoMS) and resource (RU) allocation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a user equipment (UE) is described. The method may include receiving, from a network entity, control signaling indicating an orthogonal cover coding (OCC) codeword assigned to the UE and an OCC factor, receiving an uplink grant allocating uplink resources over a series of uplink time units for a quantity of repetitions of a transmission block, and transmitting, using the assigned OCC codeword, each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor.

A UE for wireless communications is described. The UE may include one or more memories storing processor executable code, and one or more processors coupled with the one or more memories. The one or more processors may individually or collectively be operable to execute the code to cause the UE to receive, from a network entity, control signaling indicating an OCC codeword assigned to the UE and an OCC factor, receive an uplink grant allocating uplink resources over a series of uplink time units for a quantity of repetitions of a transmission block, and transmit, using the assigned OCC codeword, each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor.

Another UE for wireless communications is described. The UE may include means for receiving, from a network entity, control signaling indicating an OCC codeword assigned to the UE and an OCC factor, means for receiving an uplink grant allocating uplink resources over a series of uplink time units for a quantity of repetitions of a transmission block, and means for transmitting, using the assigned OCC codeword, each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor.

A non-transitory computer-readable medium storing code for wireless communications is described. The code may include instructions executable by one or more processors to receive, from a network entity, control signaling indicating an OCC codeword assigned to the UE and an OCC factor, receive an uplink grant allocating uplink resources over a series of uplink time units for a quantity of repetitions of a transmission block, and transmit, using the assigned OCC codeword, each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor.

Some examples of the method, UEs, and non-transitory computer-readable medium described herein may further include operations, features, means, or instructions for transmitting, to the network entity, a capability report indicating a capability of the UE to support transmission blocks over multiple slots (TBoMS) with OCC.

In some examples of the method, UEs, and non-transitory computer-readable medium described herein, the OCC codeword may be a first OCC codeword of a set of multiple OCC codewords and the set of multiple OCC codewords may be assigned to a set of multiple UEs associated with the network entity.

Some examples of the method, UEs, and non-transitory computer-readable medium described herein may further include operations, features, means, or instructions for receiving, from the network entity, an indication of a quantity of uplink time units for OCC, where the quantity of uplink time units for OCC may be a function of the OCC factor and the quantity of uplink time units.

In some examples of the method, UEs, and non-transitory computer-readable medium described herein, a function of the quantity of uplink time units for OCC and the quantity of repetitions may be less than or equal to a quotient of a value of the threshold and the OCC factor.

In some examples of the method, UEs, and non-transitory computer-readable medium described herein, the quantity of uplink time units for OCC and the OCC factor may be each based on a time-domain resource (TDRA) mapping table indicating a mapping between physical uplink shared channel (PUSCH) mapping type, a starting symbol, a symbol length, a quantity of repetitions, a quantity of slots spanning each repetition, or any combination thereof.

In some examples of the method, UEs, and non-transitory computer-readable medium described herein, the quantity of uplink time units may be greater than or equal to the OCC factor and the OCC factor may be a factor of the quantity of uplink time units.

In some examples of the method, UEs, and non-transitory computer-readable medium described herein, the series of uplink time units include a series of uplink time slots.

In some examples of the method, UEs, and non-transitory computer-readable medium described herein, the series of time units include a series of resource units for uplink narrow band-Internet of Things (NB-IoT).

In some examples of the method, UEs, and non-transitory computer-readable medium described herein, each repetition of the transmission block over the quantity of uplink time units includes a single transmission block over multiple slots (TBoMS) transmission.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 11 shows a flowchart illustrating methods that support techniques for OCC with TBoMS and RU allocation in accordance with one or more aspects of the present disclosure.

DETAILED DESCRIPTION

Figure 1:
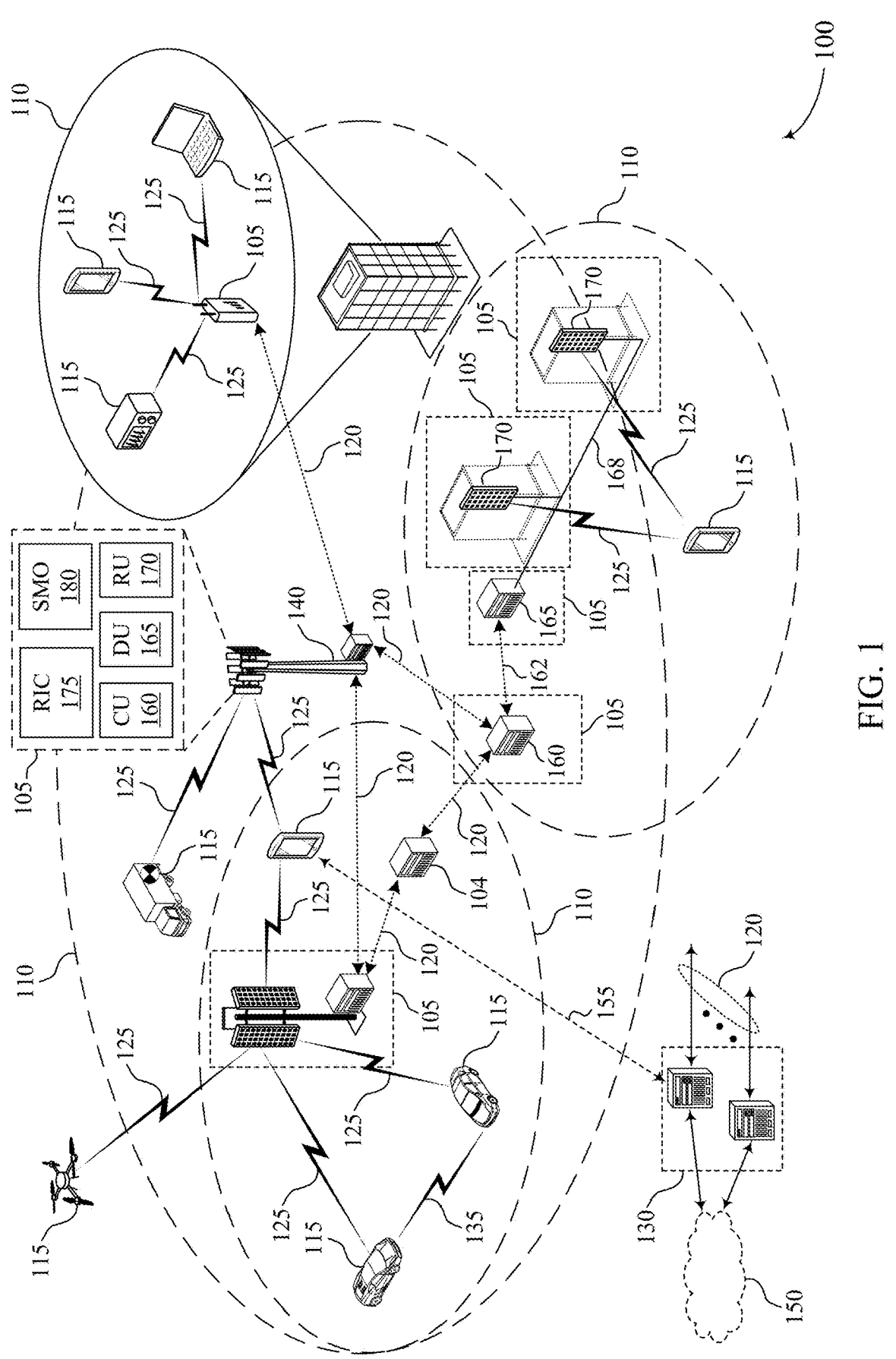
FIG. 1 shows an example of a wireless communications system that supports techniques for orthogonal cover coding (OCC) with transport block over multiple slots (TBoMS) and resource (RU) allocation in accordance with one or more aspects of the present disclosure.

Some wireless communications systems may utilize various access schemes to multiplex the uplink communications of multiple user equipments (UEs). In some instances, however, multiplexing the communications of multiple UEs may create interference at the receiving device, such as a network entity. In some cases, the network entity may utilize orthogonal cover coding (OCC) to mitigate such interference. In such cases, data from each of the multiplexed UEs may be cover coded across transmission repetitions in an orthogonal manner using OCC. Use of OCC may reduce interference at the network entity and may additionally improve overall uplink capacity and throughput at the network, which may be particularly helpful in non-terrestrial networks (NTNs) where resources may be scarcer than in other network environments.

In some implementations, OCC techniques may be utilized with different types of resource allocations. For instance, wireless communications systems that support OCC may utilize such cover-coding techniques with allocations of transport block over multiple slots (TBoMS) (e.g., in NR systems) or with allocations of resource units (RUS) (e.g., in NB-IoT systems). Use of OCC may result in spreading of an entity (e.g., a time unit, such as a slot, a cluster, an RU, etc. or a frequency unit, such as a sub-carrier) over multiple entities. The multiple entities may correspond to a quantity of UEs being multiplexed (e.g., an OCC factor). For instance, in the case that the entity is a slot and slot-based OCC is utilized, when 2 UEs are multiplexed, each slot for a given UE may be spread over 2 slots, and the 2 slots (e.g., the spread entity) may be cover-coded with an OCC codeword assigned by the network entity to that UE.

Having a sufficient quantity of resources (e.g., time units, such as slots, clusters, RUs, etc.) to support such spreading may enable the UE, and the network as a whole, to realize the benefits of OCC. In cases when a sufficient quantity of time units (e.g., slots, clusters, or RUs) is not allocated, the UE may need to split time units (e.g., split a slot, cluster, or RU) to carry the spread entity caused by OCC. In such cases, a channel coding rate may be negatively impacted, which in turn may negatively impact throughput at the network.

In accordance with aspects described herein, in order to realize the benefits of OCC, the UE may inform the network entity of its capability to support OCC, and the network entity may adhere to certain constraints when allocating uplink resources to the UE. For instance, when allocating resources for TB processing over multiple slots or for uplink NB-IoT transmissions, the network entity may ensure that a quantity of time units that is allocated for each repetition of a single TB transmission satisfies certain constraints.

Aspects of the disclosure are initially described in the context of wireless communications systems. Aspects of the disclosure are further illustrated by and described with reference to apparatus diagrams, system diagrams, and flowcharts that relate to techniques for OCC with TBoMS and RU allocation.

FIG. 1 shows an example of a wireless communications system 100 that supports techniques for OCC with TBoMS and RU allocation in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of wireless communications system 100, a network entity 105 may utilize various access schemes to multiplex the uplink communications of multiple UEs 115. In some implementations, the network entity 105 may utilize OCC to mitigate such interference. In such cases, data from each of the multiplexed UEs 115 may be cover coded across transmission repetitions in an orthogonal manner using an OCC codeword. Use of OCC may result in spreading of an entity (e.g., a time unit, such as a slot, a cluster, an RU, etc. or a frequency unit, such as a sub-carrier) over multiple entities. The multiple entities may correspond to a quantity of UEs 115 being multiplexed (e.g., an OCC factor). In accordance with aspects described in herein, the UE 115 may inform the network entity 105 of its capability to support OCC, and the network entity 105 may adhere to certain constraints when allocating uplink resources to the UE 115. For instance, when allocating resources for TB processing over multiple slots or for uplink NB-IoT transmissions, the network entity 105 may ensure that a quantity of time units (e.g., a quantity of slots, clusters, or Rus) that is allocated for each repetition of a single TB transmission satisfies certain constraints.

Figure 2:
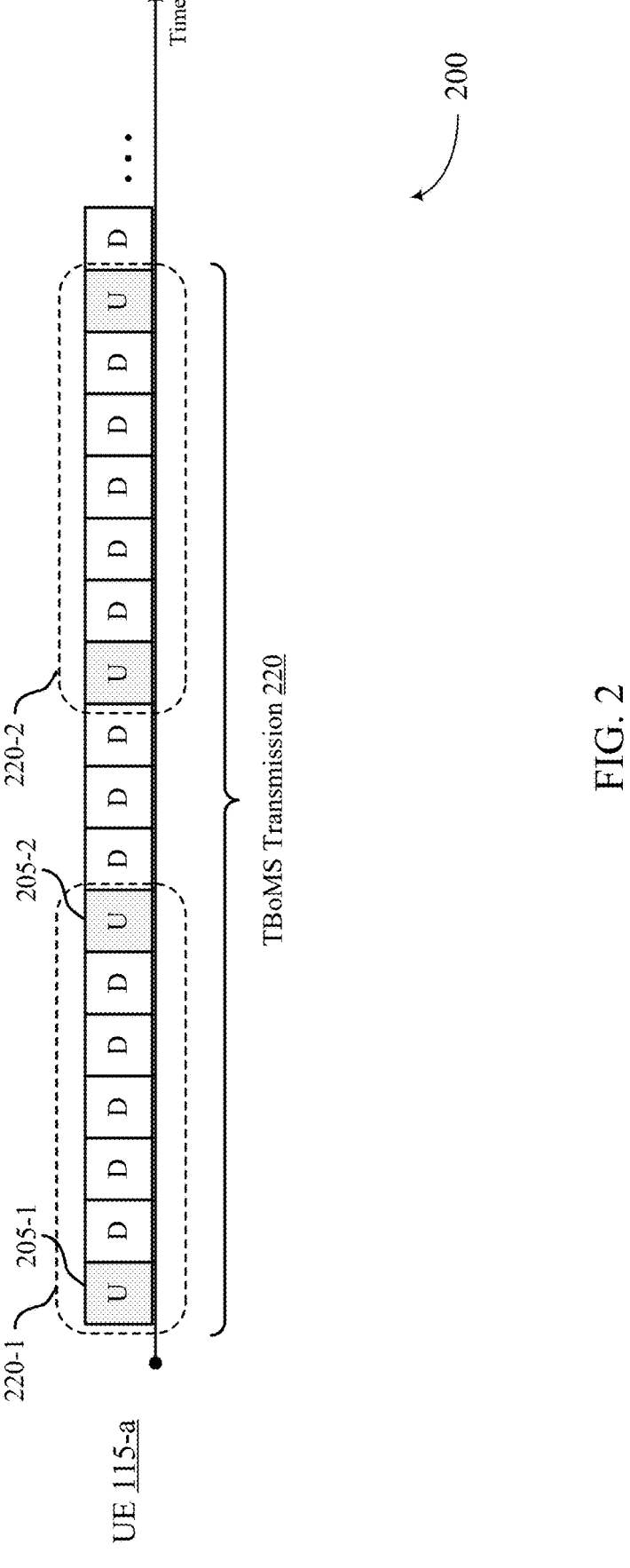
FIG. 2 shows an example of a TBoMS allocation scheme that supports techniques for OCC with TBoMS in accordance with one or more aspects of the present disclosure.

FIG. 2 shows an example of a TBoMS allocation scheme 200 that supports techniques for OCC with TBoMS allocation in accordance with one or more aspects of the present disclosure. In some cases, the TBoMS allocation scheme 200 may support or be supported by aspects of the wireless communications system 100 described with reference to FIG. 1. For instance, the TBoMS allocation scheme 200 may be a resource allocation scheme associated with resources allocated by the network entity 105 to a first UE 115-*a*, which may be an example of UE 115 described with reference to FIG. 1. In some cases, the TBoMS allocation scheme 200 may support NR NTN systems.

In some implementations, TBoMS may be used to enhance uplink coverage by transmitting a single TB over multiple slots or other time units. Accordingly, with TBoMS transmissions, a collection of slots 205 (or other time units) may be bundled together and treated as a single transmission or a single instance of a transmission. The network entity 105 may maintain various parameters used to control TBoMS transmissions. The various parameters may include, among other parameters, a quantity of repetitions (e.g., referred to as K) included in a TBoMS transmission 220 and a quantity of slots (or other time units) (e.g., referred to as N) allocated per repetition.

In the example of FIG. 2, the network entity 105 may define the quantity of repetitions to be 2 (e.g., K=2) and the quantity of slots (or other time units) per repetition to be 2 (e.g., N=2). For instance, the network entity 105 may allocate slots 205-1 and 205-2 to the first UE 115-*a* and with TBoMS transmissions these slots may be considered a single instance of TBoMS transmission 220, rather than 2 separate transmissions. For example, first TBoMS transmission repetition 220-1 may be a first instance or repetition included in TBoMS transmission 220 and second TBoMS transmission repetition 220-2 may be a second instance or repetition included in TBoMS transmission 220. In this case, TBoMS transmission 220 may be a single transmission across 4 slots (e.g., N×K), with 2 repetitions (K) of 2 slots (N) each. The network entity 105 may, additionally, employ certain constraints related to how N and K may be determined. For instance, in some cases, the network may select N and K such that a product of N and K is less than or equal to a threshold number of slots or other time units (e.g., N×K≤32 slots).

Figure 3:
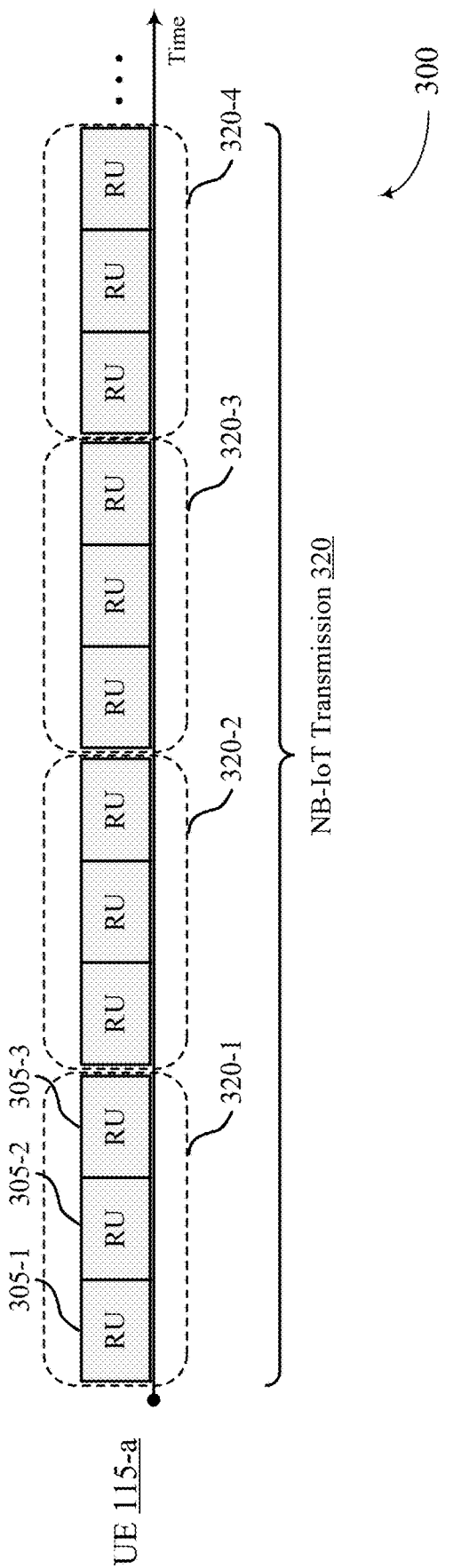
FIG. 3 show an example of an RU allocation scheme for narrow-band Internet of Things (NB-IoT) that supports techniques for OCC with RU allocation in accordance with one or more aspects of the present disclosure.

FIG. 3 shows an example of an RU allocation scheme 300 for NB-IoT that supports techniques for OCC with RU allocation in accordance with one or more aspects of the present disclosure. In some cases, the RU allocation scheme 300 may support or be supported by aspects of the wireless communications system 100 described with reference to FIG. 1. For instance, the RU allocation scheme 300 may be a resource allocation scheme associated with resources allocated by the network entity 105 to the first UE 115-*a*. In some cases, the RU allocation scheme 300 may support NB-IoT NTN systems.

As with bundling a collection of slots in TBoMS transmissions, with uplink NB-IoT processing, in some implementations, a collection of RUs 305 may be bundled together and treated as a single transmission or a single instance of a transmission. In this way, uplink coverage in NB-IoT systems may be enhanced by transmitting a single TB over multiple RUs. In this case, the network entity 105 may maintain various parameters used to control RU allocations for uplink NB-IoT transmissions. The various parameters may include, among other parameters, a quantity of repetitions or redundancy value (RV) cycles (e.g., referred to as $N_{rep}$) included in an NB-IoT transmission 320 and a quantity of RUs (e.g., referred to as $N_{RU}$) allocated for a TB per repetition (e.g., a quantity of RUs that the TB is mapped to). For example, each RV cycle (e.g., repetition) may include of a quantity of RUs (e.g., RV=$N_{RU}$×RUs), each RU may include a quantity of uplink slots $$\left(\text{e.g., referred to as } N_{slots}^{UL}\right),$$

each uplink slot may include a quantity of uplink symbols $$\left(\text{e.g., referred to as } N_{symb}^{UL}\right),$$

and each uplink symbol may include a quantity of sub-carriers $$\left(\text{e.g., referred to as } N_{sc}^{RU}\right).$$

Accordingly, each RV cycle (e.g., repetition) may include $$N_{sc}^{RU} \times N_{RU} \times \left(N_{slots}^{UL} \times N_{symb}^{UL}\right)$$

resource elements, and a total quantity of resource elements allocated for each uplink NB-IoT transmission may be $$N_{rep} \times N_{sc}^{RU} \times N_{RU} \times \left(N_{slots}^{UL} \times N_{symb}^{UL}\right)$$

In the example of FIG. 3, the network entity 105 may define the quantity of repetitions or RV cycles to be 4 (e.g., $N_{rep}$=4) and the quantity of RUs per repetition/RV cycle to be 3 (e.g., $N_{RU}$=3). For instance, the network entity 105 may allocate RUs 305-1, 305-2, 305-3 to the first UE 115-*a* and with uplink NB-IoT processing, a single TB may be mapped to these RUs and the 3 RUs may be considered a single instance of a NB-IoT transmission 320, rather than 3 separate transmissions. For example, first NB-IoT transmission repetition 320-1 may be a first repetition or RV cycle associated with NB-IoT transmission 320, second NB-IoT transmission repetition 320-2 may be a second repetition or RV cycle associated with NB-IoT transmission 320, third NB-IoT transmission repetition 320-3 may be a third repetition or RV cycle associated with NB-IoT transmission 320, and fourth NB-IoT transmission repetition 320-4 may be a fourth repetition or RV cycle associated with NB-IoT transmission 320. In this case, NB-IoT transmission 320 may be a single transmission across 12 RUs (e.g., $N_{RU} \times N_{rep}$), with 4 repetitions ($N_{rep}$) of 3 RUs ($N_{RU}$) each. The network entity 105 may, additionally, employ certain constraints related to how $N_{RU}$ and $N_{rep}$ may be determined. For instance, in some cases, the network may select $N_{RU}$ and $N_{rep}$ such that a product of $N_{RU}$ and $N_{rep}$ is less than or equal to a threshold number of RUs.

Figure 4:
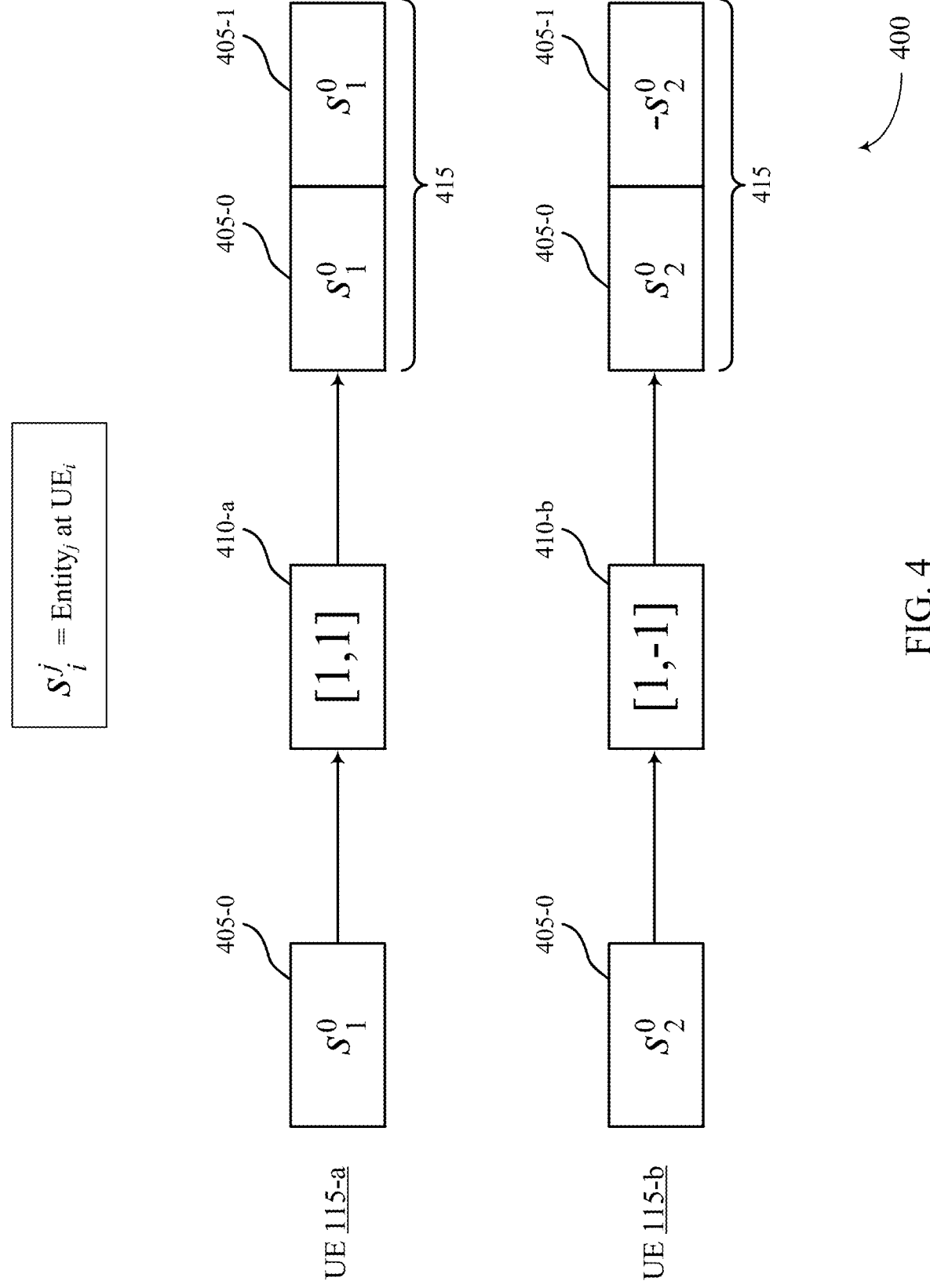
FIG. 4 shows example of an OCC scheme that supports techniques for OCC with TBoMS and RU allocation in accordance with one or more aspects of the present disclosure.

FIG. 4 shows an example of an OCC scheme 400 that supports techniques for OCC with TBoMS and RU allocation in accordance with one or more aspects of the present disclosure. In some cases, the OCC scheme 400 may support or be supported by aspects of the wireless communications system 100 described with reference to FIG. 1. For instance, the OCC scheme 400 may be a cover coding scheme configured by the network entity 105 for a first UE 115-*a* and a second UE 115-*b*, which may be examples of the UE 115 described with reference to FIG. 1.

In some implementations, OCC techniques may be utilized to reduce interference at the network entity 105 when uplink communications from multiple UEs, such as the first UE 115-*a* and the second UE 115-*b*, are multiplexed. For instance, when the uplink communications of the first UE 115-*a* and the second UE 115-*b* are multiplexed they may share the same uplink time and frequency resources and, accordingly, may transmit on the shared resources at the same time. In such cases, the network entity 105 may receive a summation or a super-imposition of the signals from the UEs. In some cases, the multiplexed signal may result in interference at the network entity 105. To mitigate such interference, the network entity 105 may configure each of the multiplexed UEs to use an assigned OCC codeword to cover code their respective uplink transmission. The cover coding may cause data transmissions from each of the multiplexed UEs to be orthogonal to one another. When the network entity 105 receives a multiplexed cover coded transmission from the multiplexed UEs, the network entity 105 may use the assigned OCC codewords to separate the super-imposed multiplexed signal to identify which portion of the signal was transmitted from which UE. For instance, by decoding the received multiplexed signal with the OCC codeword assigned to a particular UE, such as the first UE 115-*a*, the network entity 105 may be able to retrieve, from the multiplexed signal, the specific signal transmitted by the first UE 115-*a*. Likewise, by decoding the multiplexed signal with the OCC codeword assigned to the second UE 115-*b*, the network entity 105 may be able to retrieve the specific signal transmitted by the second UE 115-*b*.

Use of OCC may result in spreading of an entity over multiple entities, e.g., M entities, where M may represent a multiplexing factor (e.g., a quantity of multiplexed UEs) or an OCC factor (e.g., an OCC order). The entity may be a resource element (e.g., a sub-carrier), a slot, an OFDM symbol, a cluster, an RU, etc., and may be determined based on a type of OCC being performed, such as OCC across slots, within OFDM symbols, across OFDM symbols, across clusters, etc. Accordingly, a transmission originally allocated to one entity (e.g., one resource element) may be spread into a quantity of entities or resource elements that is equal to the OCC factor (e.g., a quantity of UEs being multiplexed). By way of example, when the first UE 115-*a* and the second UE 115-*b* are multiplexed (e.g., M=2), an entity (e.g., a slot or an RU) associated with the first UE 115-*a* and an entity associated with the second UE 115-*b* may be spread into 2 respective entities using an OCC codeword assigned to the UE by the network entity 105.

In the example of FIG. 4, the uplink transmissions of the first UE 115-*a* and the second UE 115-*b* may be multiplexed and the UEs may share uplink time and frequency resources, such as a slot 0 405-0. To mitigate interference caused by sharing slot 0 405-0, the network entity 105 may assign, to the first UE 115-*a*, a first OCC codeword 410-*a* of [1,1] for cover coding transmissions from the first UE 115-*a*, and may assign, to the second UE 115-*b*, a second OCC codeword 410-*b* of [1,−1] for cover coding transmissions from the second UE 115-*b*. The first OCC codeword 410-*a* and the second OCC codeword 410-*b* may be orthogonal to one another. Accordingly, a first transmission $$(e.g., s_1^0)$$

from the first UE 115-*a* at slot 0 405-0 may be cover coded with the first OCC codeword 410-*a* (e.g., [1,1]), resulting in the original first transmission $$(e.g., s_1^0)$$

being spread $$(e.g., s_1^0, s_1^0)$$

into 2 slots, such as the original slot 0 405-0 and an additional slot 405-1, (collectively, spread slots 415 having a factor of 2 (e.g., M=2)). Further, a second transmission $$(e.g., s_2^0)$$

from the second UE 115-*b* at shared slot 0 405-0 may be cover coded with the second OCC codeword 410-*b* (e.g., [1,−1]), resulting in the original second transmission $$(e.g., s_2^0)$$

being spread $$(e.g., s_{2'}^0 - s_2^0)$$

into 2 slots, such as the original slot 0 405-0 and the additional slot 405-1, (collectively, spread slots 415 having a factor of 2 (e.g., M=2))

Accordingly, when the first and second transmissions from the first UE 115-*a* and the second UE 115-*b*, respectively, are spread across the spread slots 415, the transmissions may occupy the same time and frequency resources, e.g., may be multiplexed. However, because the codewords assigned to each of the first UE 115-*a* and the second UE 115-*b* may be orthogonal to one another, the spread first and second transmission may also be orthogonal to each other. As a result, the network entity 105 may use the respective codewords to decode the multiplexed transmissions from first UE 115-*a* and the second UE 115-*b* and receive the corresponding transmissions.

In some implementations, OCC may be used with TBoMS transmissions or uplink NB-IoT transmissions. In such cases, the network entity 105 may employ additional constraints to ensure that a sufficient quantity of time resources (such as a sufficient quantity of time units, e.g., slots, RUs, or other time units) are allocated to support the spreading of data across multiple entities or resource elements when OCC is utilized. For instance, the network entity 105 may employ constraints related to how a quantity of repetitions (e.g., K for TBoMS and $N_{rep}$ for NB-IoT) is determined for each TBoMS transmission (such as TBoMS transmission 220 of FIG. 2) or for each NB-IoT transmission (such as NB-IoT transmission 320 of FIG. 3). The network entity 105 may additionally employ constraints related to how a quantity of time units (e.g., N for TBoMS or $N_{RU}$ for NB-IoT) is determined for each TBoMS transmission repetition (such as the first and second TBoMS transmission repetitions 220-1 and 220-2 of FIG. 2) or for each NB-IoT transmission repetition (such as the first through fourth NB-IoT transmission repetitions 320-1 to 320-4 of FIG. 3). In cases when a sufficient quantity of time resources is not allocated, the UE may have to split a single time resource (e.g., split a slot, a RU, or other time unit) to support the spreading caused by OCC. In such cases, a channel coding rate may be negatively impacted, which in turn may negatively impact throughput at the network. Accordingly, by ensuring that sufficient resources are available to support such spreading, the benefits of OCC may be realized.

Figure 5A:
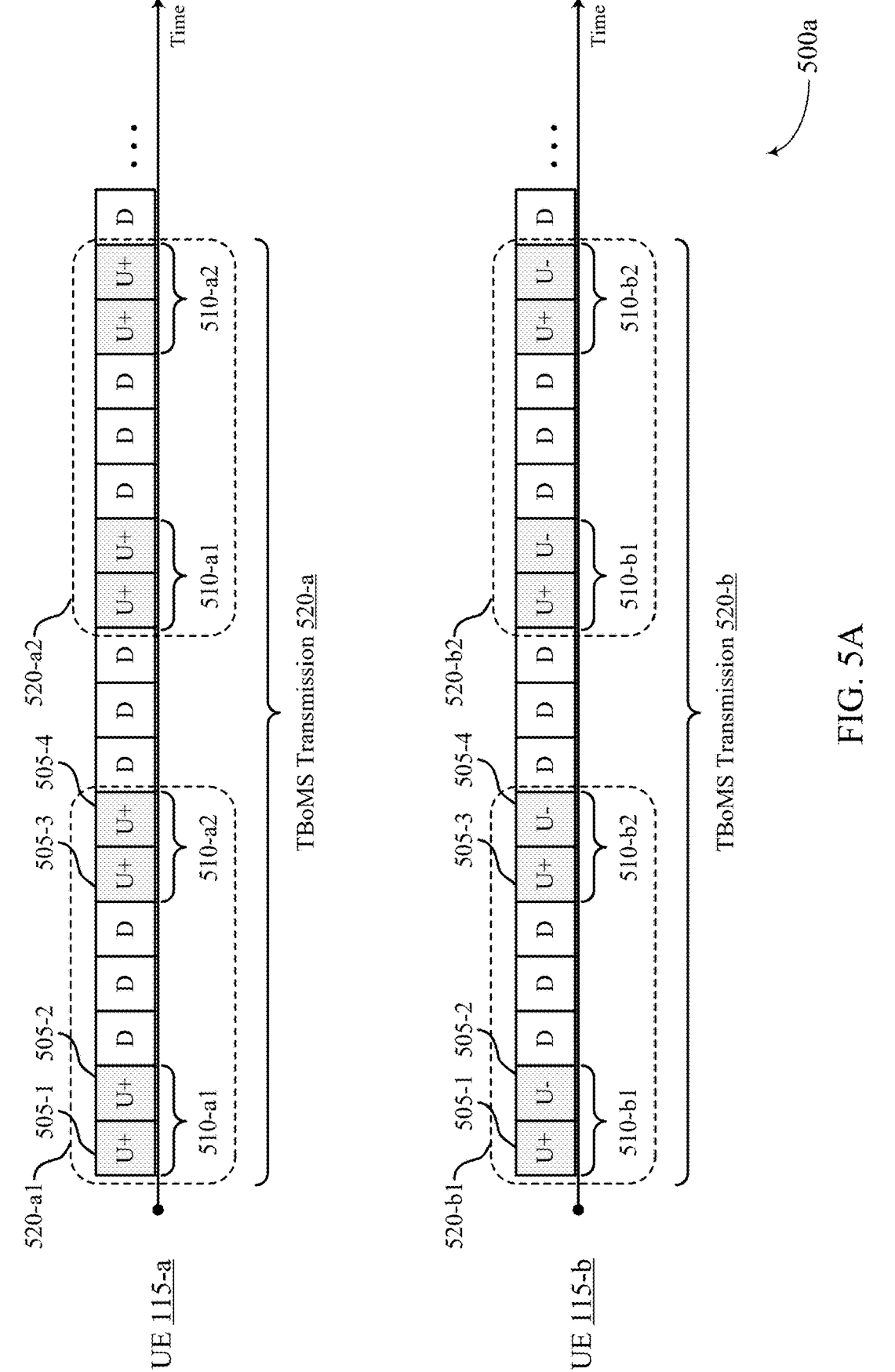
FIGS. 5A and 5B show examples of TBoMS allocations that support techniques for OCC with TBoMS and RU allocation in accordance with one or more aspects of the present disclosure.

FIG. 5A shows an example of TBoMS allocations 500*a* that supports techniques for slot-wise OCC in accordance with one or more aspects of the present disclosure. In some cases, the TBoMS allocations 500*a* may support or be supported by aspects of the wireless communications system 100, the TBoMS allocation scheme 200, RU allocation scheme 300, OCC scheme 400, described with reference to FIGS. 1 to 4. For instance, in some implementations, the OCC scheme 400 may be configured by the network entity 105 for the first UE 115-*a* and the second UE 115-*b* and applied to the TBoMS allocation scheme 200 or the RU allocation scheme 300.

In some implementations, OCC techniques may be used with TBoMS transmissions or uplink NB-IoT transmissions and the network entity may ensure that sufficient time units are allocated to the UE to support the spreading produced by OCC. For instance, referring to FIG. 2, in the case that uplink transmissions from the first UE 115-*a* are multiplexed with uplink transmissions from the second UE 115-*b* such that uplink resources are shared, the network entity 105 may configure each of the first UE 115-*a* and the second UE 115-*b* with an OCC codeword, such as the first OCC codeword 410-*a* (e.g., [1,1]) and the second OCC codeword 410-*b* (e.g., [1,−1]), respectively, as described with reference to FIG. 4. Accordingly, when OCC is performed in a slot-wise manner and the OCC codeword is applied to the first TBoMS transmission repetition 220-1 across slots 205-1 and 205-2 (e.g., considered a single transmission), the OCC codeword may cause the first TBoMS transmission repetition 220-1 to be spread across slots by the OCC factor (e.g., where the OCC factor may be equivalent to the quantity of UEs being multiplexed, e.g., M=2). The OCC codeword may likewise be applied to other repetitions of the TBoMS transmission 220, such as the second TBoMS transmission repetition 220-2. As such, referring back to FIG. 5A, the network entity 105 may allocate a sufficient quantity of time units to support such spreading. For instance, the network entity 105 may allocate 4 slots, such as slots 505-1, 505-2, 505-3, and 505-4 (which may be shared between the first UE 115-*a* and the second UE 115-*b* for uplink transmissions) to support OCC with TBoMS.

In this case, the first UE 115-*a* may apply the first OCC codeword 410-*a* (e.g., [1,1]) to its TBoMS transmission (such as to each repetition of the TBoMS transmission 220, e.g., the first TBoMS transmission repetition 220-1 across slots 205-1 and 205-2), which may result in cover-coded repetitions 510-*a*1 and 510-*a*2. In this case, the cover-coded repetitions 510-*a*1 and 510-*a*2 may be considered a single instance or single repetition of an OCC TBoMS transmission 520-*a*. For example, first OCC TBoMS transmission repetition 520-*a*1 may be a first instance or repetition included in OCC TBoMS transmission 520-*a* and second OCC TBoMS transmission repetition 520-*a*2 may be a second instance or repetition included in OCC TBoMS transmission 520-*a*. In this case, OCC TBoMS transmission 520-*a* may be a single transmission across 8 slots (e.g., N×K), with 2 repetitions (K) of 4 slots (N) each.

Likewise, the second UE 115-*b* may apply the second OCC codeword 410-*b* (e.g., [1,−1]) to its TBoMS transmission, which may result in cover-coded repetitions 510-*b*1 and 510-*b*2. In this case, the cover-coded reps 510-*b*1 and 510-*b*2 may be considered a single instance or single repetition of an OCC TBoMS transmission 520-*b*. For example, first OCC TBoMS transmission repetition 520-*b*1 may be a first instance or repetition included in OCC TBoMS transmission 520-*b* and second OCC TBoMS transmission repetition 520-*b*2 may be a second instance or repetition included in OCC TBoMS transmission 520-*b*. In this case, OCC TBoMS transmission 520-*b* may be a single transmission across 8 slots (e.g., N×K), with 2 repetitions (K) of 4 slots (N) each. As a result of the first UE 115-*a* and the second UE 115-*b* applying their assigned OCC codewords to their respective transmissions, the transmissions may be orthogonal to one another and thereby mitigate interference that might otherwise occur.

In some implementations, OCC may be applied in a similar manner to RU allocations in NB-IoT systems.

Figure 5B:
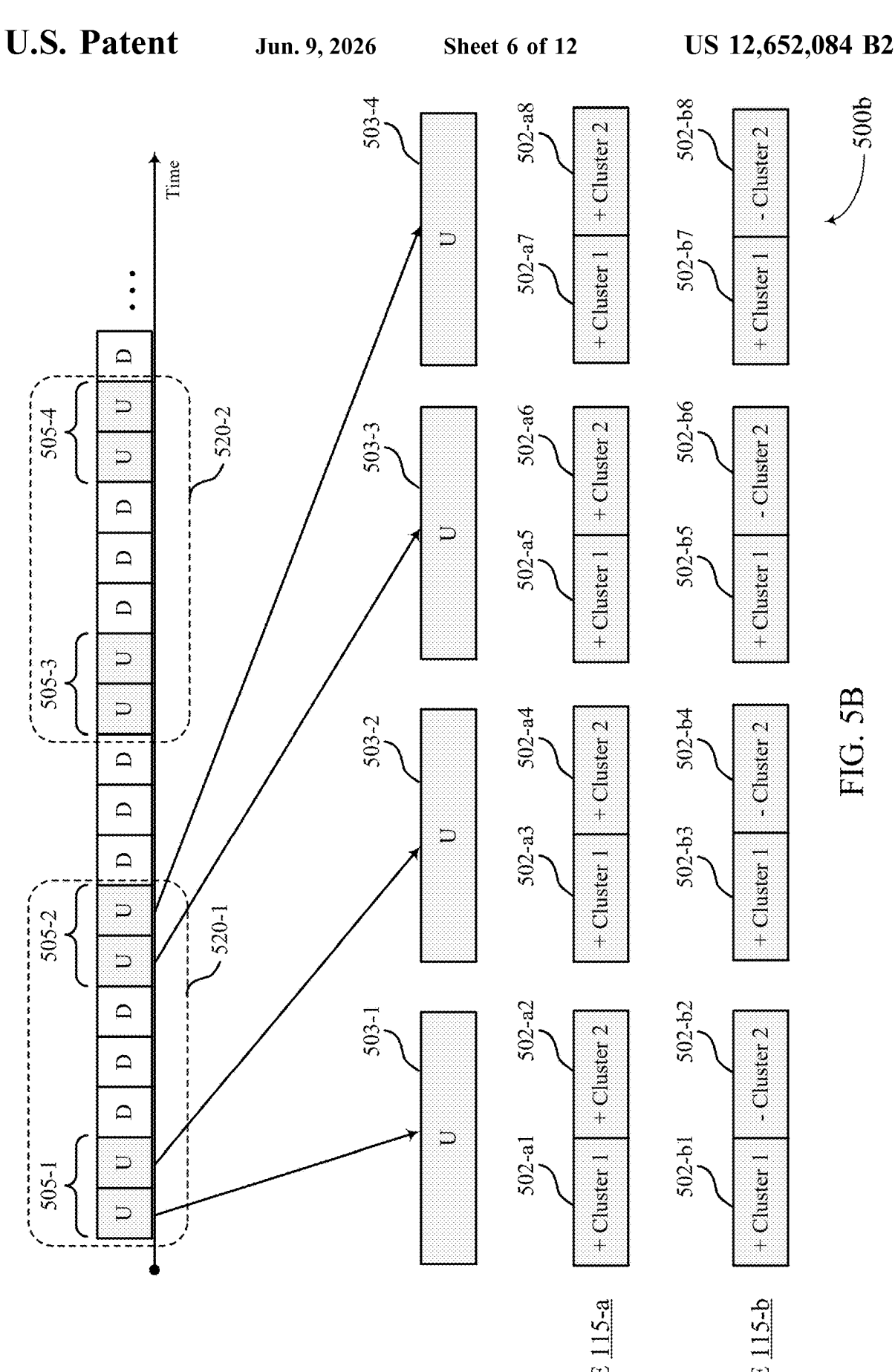

FIG. 5B shows an example of TBoMS allocations 500*b* that supports techniques for cluster-wise OCC in accordance with one or more aspects of the present disclosure. In some cases, the TBoMS allocations 500*b* may support or be supported by aspects of the wireless communications system 100, the TBoMS allocation scheme 200, RU allocation scheme 300, OCC scheme 400, described with reference to FIGS. 1 to 4. For instance, in some implementations, the OCC scheme 400 may be configured by the network entity 105 for the first UE 115-a and the second UE 115-b.

In some implementations, cluster-wise OCC may be used with TBoMS. In the example of FIG. 5A, a first TBoMS transmission repetition 520-1 may be across slots 505-1 and 505-2 and a second TBoMS transmission repetition 520-2 may be across slots 505-3 and 505-4. Each of the slots 505 may additionally include one or more clusters 503. For instance, each of slots 505-1, 505-2, 505-3, and 505-4 may include 2 clusters 503. For example, slot 505-1 may include clusters 503-1 and 503-2 and slot 505-2 may include clusters 503-3 and 503-4. In this case, OCC may be applied across the each of the clusters 503-1, 503-2, 503-3, and 503-4 that make up the first TBoMS transmission repetition 520-1. In this case, a single cluster 503 may be spread into multiple clusters by an order of the OCC factor (e.g., a quantity of multiplexed UEs).

As such, when the uplink communications of the first UE 115-a and the second UE 115-b are multiplexed, the first UE 115-a may apply the first OCC codeword 410-a (e.g., [1,1]) to its first TBoMS transmission repetition 520-1, which may result in cover-coded clusters 502-a1, 502-a2, 502-a3, 502-a4, 502-a5, 502-a6, 502-a7, and 502-a8. The first UE 115-a may additionally apply the first OCC codeword 410-a to its second TBoMS transmission repetition 520-2. Likewise, the second UE 115-b may apply the second OCC codeword 410-b (e.g., [1,–1]) to its first TBoMS transmission repetition 520-1, which may result in cover-coded clusters 502-b1, 502-b2, 502-b3, 502-b4, 502-b5, 502-b6, 502-b7, and 502-b8. The second UE 115-b may additionally apply the second OCC codeword 410-b to its second TBoMS transmission repetition 520-2.

Accordingly, to ensure that UE has sufficient time resources to support OCC, in either TBoMS transmissions or NB-IoT transmissions, the network entity 105 may adhere to certain constraints when allocating timing resources. As such, the network entity 105 may select OCC-related parameters that adhere to such constraints. For instance, the network entity 105 may select values for a quantity of repetitions per TBoMS or NB-IoT transmission (e.g., K or $N_{rep}$), a quantity of time units per repetition (e.g., N or $N_{RU}$), and a OCC factor (e.g., M). In some cases, the network entity 105 may indicate such OCC-related parameter values to the first UE 115-a and the second UE 115-b. For instance, the network entity 105 may transmit the OCC-related parameter values to the first UE 115-a and the second UE 115-b via control signaling, including via DCI (e.g., DCI format N0). In some cases, the network entity 105 may transmit the OCC-related parameters together with an UL grant.

For instance, in some implementations, in addition to ensuring that N×K≤threshold quantity of slots (e.g., 32), the network entity 105 may also ensure that the quantity of time units is greater than or equal to the OCC factor (e.g., N≥M or $N_{RU}$≥M). In this case, when this constraint is applied, additional constraints may also be applied for specific types of OCC. For example, for symbol-wise OCC, a total quantity of OFDM data symbols in N slots may be a multiple of the OCC factor (M) (e.g., for circular buffer manipulation/rate matching changes). Alternatively, a total quantity of OFDM data symbols in each slot may be a multiple of the OCC factor (M) (e.g., may use legacy rate matching). As an additional example, for slot-wise OCC, a total quantity of OFDM slots (e.g., N) may be a factor of the OCC factor (M). Further, in the case of NB-IoT, the network entity 105 may additionally utilize one or more NB PUSCH (NPUSCH) mapping tables to the select the quantity of time units (e.g., $N_{RU}$) or the quantity of repetitions (e.g., K). For instance, the network entity 105 may use an NPUSCH mapping table that maps resource assignment ($I_{RU}$) values to different quantities of resource units ($N_{RU}$) to enable selection of an $I_{RU}$ value such that $N_{RU}$≥M.

In some implementations, in addition to ensuring that N×K≤threshold quantity of slots (e.g., 32), if the UE (e.g., the first UE 115-a or the second UE 115-b) supports OCC and the network entity 105 is aware of the UE's capability to support OCC, when the UE receives the OCC-related parameters, the UE may interpret the received quantity of time units (e.g., N or $N_{RU}$) as a quantity of time units for a UE supporting OCC $$\left(\text{e.g., } N_{occ} \text{ or } N_{RU}^{OCC}\right).$$

That is, the UE may utilize the received N to calculate the $N_{occ}$, where $N_{occ}$=M×N or where $$N_{RU}^{OCC} = M \times N_{RU}.$$

The UE may, thereafter, utilize the $N_{occ}$ for its uplink transmissions. In such cases, the network entity 105, having knowledge of the UE's capability to support OCC, may know that uplink transmissions received from the UE may be based on the $N_{occ}$. The network entity 105, in turn, may ensure that $$N_{occ} \times K \le \frac{32}{M}.$$

In some implementations, in addition to ensuring that N×K≤threshold quantity of slots (e.g., 32), the network entity 105 may ensure that the quantity of time units (e.g., N or $N_{RU}$) is greater than or equal to the OCC factor (e.g., M) (e.g., N≥M or $N_{RU}$≥M), where the OCC factor (e.g., M) is a factor of (e.g., N or $N_{RU}$).

The above constraints may be applied to various types of OCC, such as FD-OCC, TD-OCC, cluster-wise OCC, slot-wise OCC, sub-physical resource block (PRB) OCC, or any other type of OCC. The network entity 105 may also ensure that, for a given OCC factor (e.g., M), only valid entries in a TBoMS time/domain resource allocation (TDRA) mapping table may be calculated. For instance, for normal cyclic prefix (CP)-OFDM, when a starting symbol (S) is 0 and a consecutive symbol length (L) is 14 (e.g., as indicated in the TDRA mapping table), the combination of S and L may be valid. However, in other cases, such as for symbol-wise TD-OCC, there may be instances for different S and L values in which the combination of S and L might not be valid.

Figure 6:
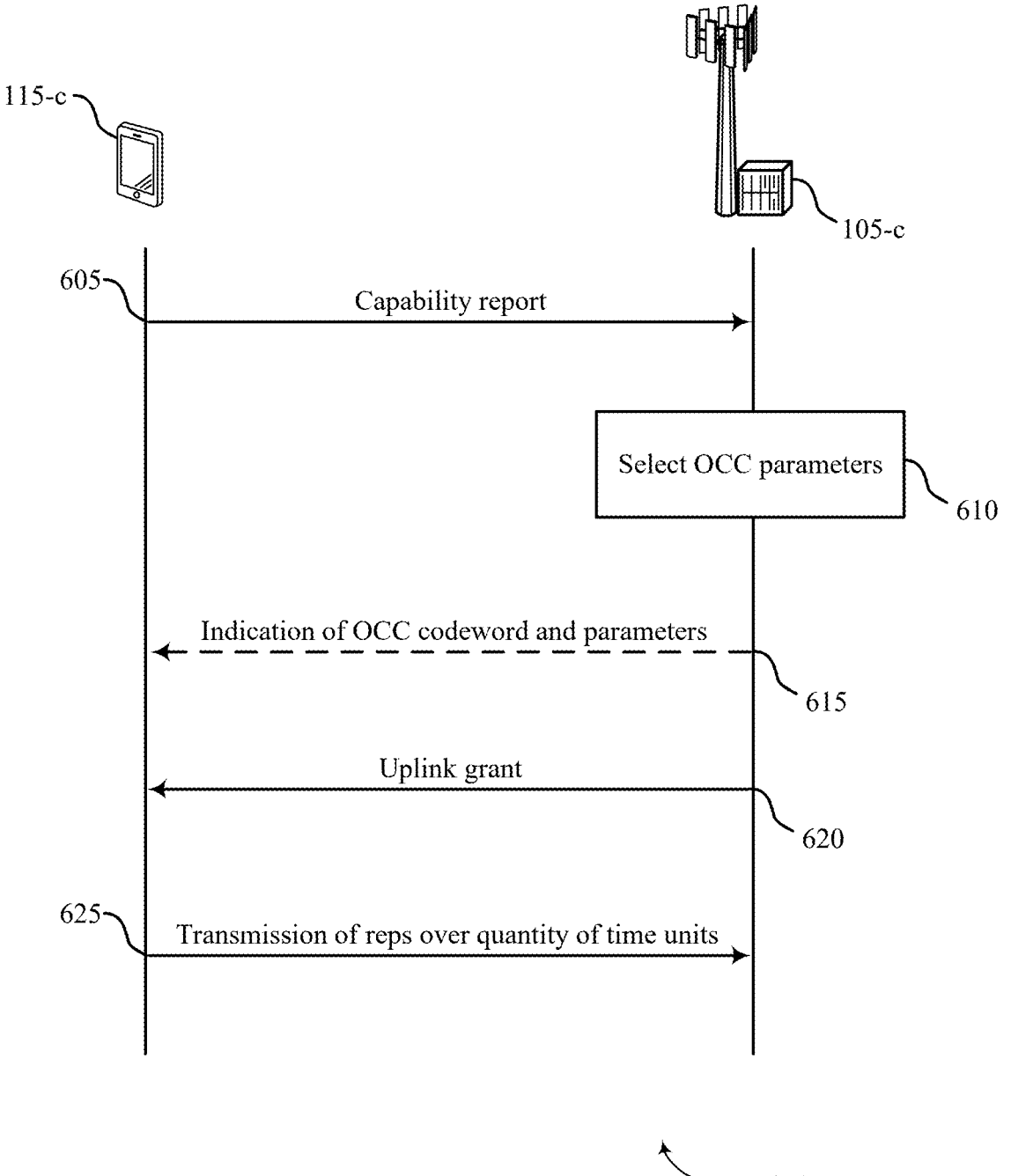
FIG. 6 shows an example of a signal flow that supports techniques for OCC with TBoMS and RU allocation in accordance with one or more aspects of the present disclosure.

FIG. 6 shows an example of a signal flow 600 that supports techniques for OCC with TBoMS and RU allocation in accordance with one or more aspects of the present disclosure. In some examples, signal flow 600 may support, implement, or be implemented by aspects of wireless communications system 100, the TBoMS allocation scheme 200, RU allocation scheme 300, OCC scheme 400, TBoMS allocations 500a and 500b, described with reference to FIGS. 2, 3, 4, 5A and 5B. For instance, signal flow 600 may be implemented by a network entity 105-c and a UE 115-c, which may be examples of the network entity 105 and the UE 115, the first UE 115-a, and the second UE 115-b, described with reference to FIGS. 1, 2, 3, 4, 5A and 5B. Alternative examples of the following operations may be implemented, where some steps are performed in a different order than described, or are not performed at all. In some cases, steps may include additional features not mentioned below, or further steps may be added.

At 605, the UE 115-*c* may send, and the network entity 105-*c* may receive, a capability report indicating the capability of the UE 115-*c* for supporting OCC. In some cases, the capability report may indicate a capability for supporting OCC with TBoMS transmissions or uplink RU transmissions for NB-IoT.

At 610, based on the capability of the UE 115-*c* to support OCC, the network entity 105-*c* may select one or more OCC-related parameters. For instance, the network entity 105-*c* may select parameters such as an OCC codeword to be assigned to the UE 115-*c*, a quantity of time units (e.g., a quantity of slots, clusters, RUs, etc.) allocated for each TB repetition, a quantity of repetitions, an OCC factor, or a combination thereof. In some cases, the network entity 105-*c* may select the OCC-related parameters from one or more mapping tables. For instance, a TBoMS TDRA mapping table may be used to select the quantity of time units (e.g., slots) or the number of repetitions, in the case that the UE 115-*c* supports OCC with TBoMS transmissions. In the case that the UE 115-*c* supports OCC with RU transmissions for NB-IoT, one or more NPUSCH mapping tables may be used to the select the quantity of time units (e.g., RUs) or the quantity of repetitions. In some cases, the network entity 105-*c* may ensure that the selected quantity of time units and quantity of repetitions satisfy certain constraints, such as described with reference to FIGS. 2, 3, 4, 5A, and 5B. For instance, the network entity 105-*c* may ensure that a function (e.g., a product) of the quantity of uplink time units and the quantity of repetitions satisfies a threshold (e.g., a threshold quantity of time slots). In some cases, the network entity 105-*c* may, additionally or alternatively, ensure that the quantity of uplink time units is greater than or equal to an OCC factor (e.g., a quantity of UE's being multiplexed).

At 615, the network entity 105-*c* may send, and the UE 115-*c* may receive, control signaling that indicates an OCC codeword assigned to the UE 115-*c*, one or more OCC parameters, such as an OCC factor, a quantity of repetitions for a transmission (e.g., a TBoMS or an NB-IoT transmission) and a quantity of time units for each of the repetitions, or a combination of these.

At 620, the network entity 105-*c* may send, and the UE 115-*c* may receive, an uplink grant allocating uplink resources over a series of uplink time units for a quantity of repetitions of a transmission block (e.g., a TBoMS or an redundancy value (RV) cycle). That is, the uplink grant may allocate the quantity of uplink time units for each repetition of the quantity of repetitions, and the series of uplink time units may represent the total quantity of uplink time units across the indicated quantity of repetitions.

In some cases, one or more of the OCC codeword, OCC factor, quantity of repetitions, or quantity of time units may be carried in the uplink grant (described with respect to step 615 above) instead of being carried in separate control signaling. For instance, in the case that the UE 115-*c* supports OCC with TBoMS transmission, such information may be carried in a DCI that schedules the PUSCH for the TBoMS (e.g., in DCI format 0_1), and in the case that the UE 115-*c* supports OCC with RU transmission, the information may be carried in a DCI that schedules the NPUSCH for the RU (e.g., in DCI format N0).

At 625, the UE 115-*c* may send a transmission of one or more repetitions of a TB over the indicated quantity of time units. That is, the UE 115-*c* may use the assigned OCC codeword in transmitting each repetition of the indicated quantity of repetitions of the TB over the indicated quantity of uplink time units. Based on the constraints applied by the network entity 105-*c* (e.g., at 610), a function (e.g., a product) of the quantity of uplink time units and the quantity of repetitions may satisfy a threshold (e.g., a threshold quantity of time slots), and the quantity of uplink time units may be greater than or equal to an OCC factor (e.g., a quantity of UE's being multiplexed).

Figure 7:
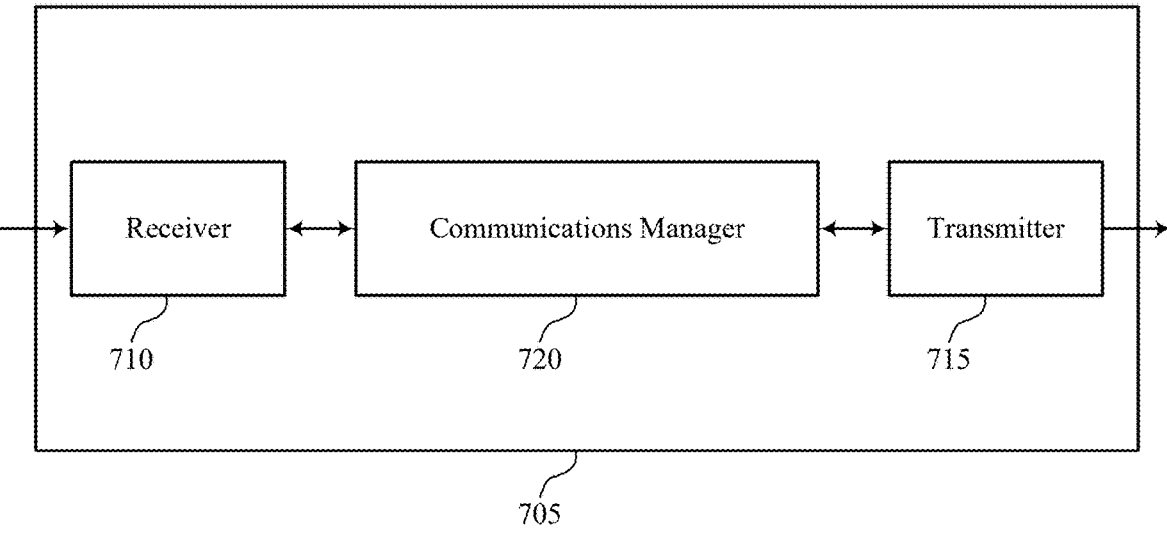
FIGS. 7 and 8 show block diagrams of devices that support techniques for OCC with TBoMS and RU allocation in accordance with one or more aspects of the present disclosure.

FIG. 7 shows a block diagram 700 of a device 705 that supports techniques for OCC with TBoMS and RU allocation in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for OCC with TBoMS and RU allocation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for OCC with TBoMS and RU allocation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of techniques for OCC with TBoMS and RU allocation as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving, from a network entity, control signaling indicating an OCC codeword assigned to the UE and an OCC factor. The communications manager 720 is capable of, configured to, or operable to support a means for receiving an uplink grant allocating uplink resources over a series of uplink time units for a quantity of repetitions of a transmission block. The communications manager 720 is capable of, configured to, or operable to support a means for transmitting, using the assigned OCC codeword, each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for more efficient utilization of communication resources.

Figure 8:
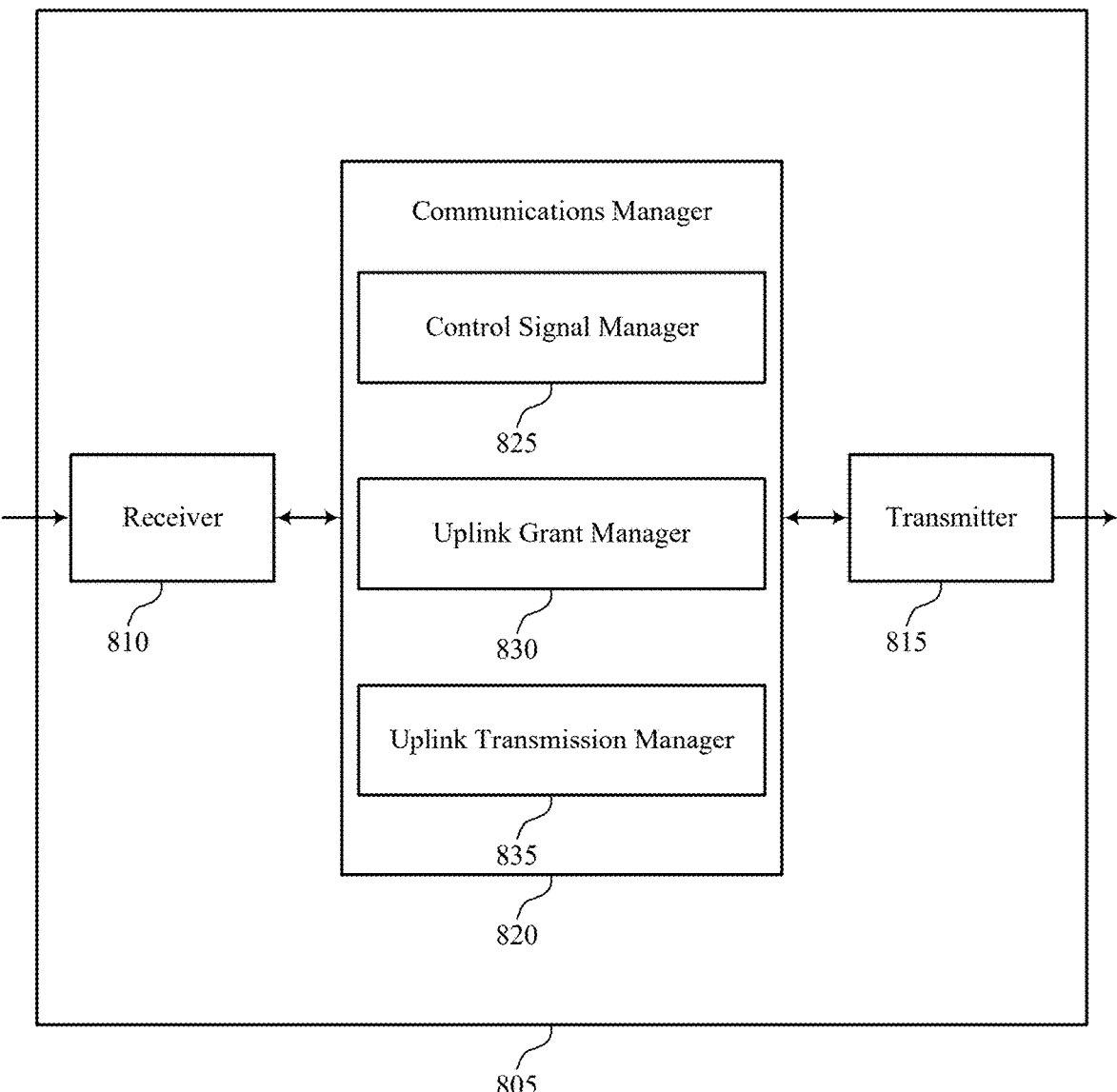

FIG. 8 shows a block diagram 800 of a device 805 that supports techniques for OCC with TBoMS and RU allocation in accordance with one or more aspects of the present disclosure. The device 805 may be an example of aspects of a device 705 or a UE 115 as described herein. The device 805 may include a receiver 810, a transmitter 815, and a communications manager 820. The device 805, or one of more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for OCC with TBoMS and RU allocation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for OCC with TBoMS and RU allocation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for OCC with TBoMS and RU allocation as described herein. For example, the communications manager 820 may include a control signal manager 825, an uplink grant manager 830, an uplink transmission manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The control signal manager 825 is capable of, configured to, or operable to support a means for receiving, from a network entity, control signaling indicating an OCC codeword assigned to the UE and an OCC factor. The uplink grant manager 830 is capable of, configured to, or operable to support a means for receiving an uplink grant allocating uplink resources over a series of uplink time units for a quantity of repetitions of a transmission block. The uplink transmission manager 835 is capable of, configured to, or operable to support a means for transmitting, using the assigned OCC codeword, each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor.

In some cases, the control signal manager 825, the uplink grant manager 830, and the uplink transmission manager 835 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signal manager 825, the uplink grant manager 830, and the uplink transmission manager 835 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
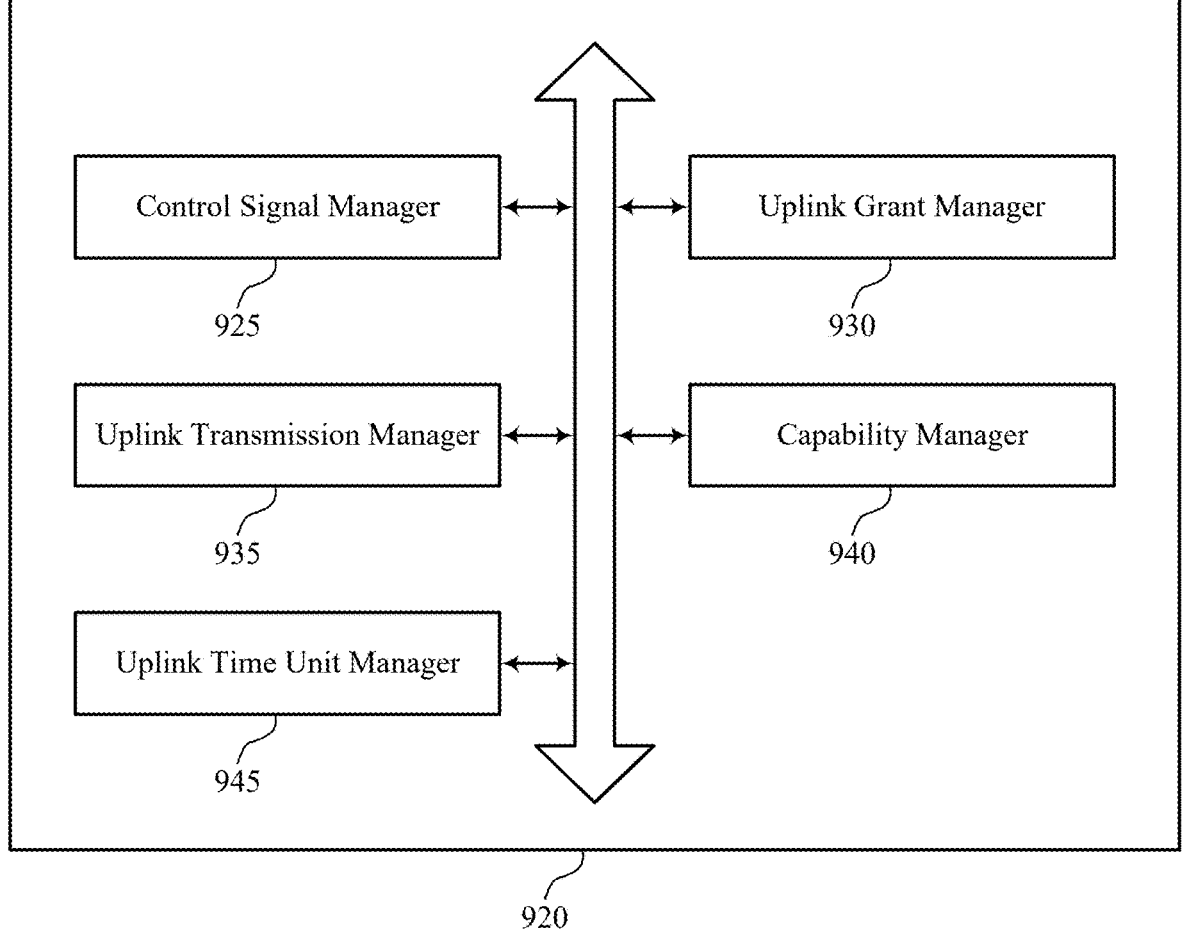
FIG. 9 shows a block diagram of a communications manager that supports techniques for OCC with TBoMS and RU allocation in accordance with one or more aspects of the present disclosure.

FIG. 9 shows a block diagram 900 of a communications manager 920 that supports techniques for OCC with TBoMS and RU allocation in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for OCC with TBoMS and RU allocation as described herein. For example, the communications manager 920 may include a control signal manager 925, an uplink grant manager 930, an uplink transmission manager 935, a capability manager 940, an uplink time unit manager 945, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The control signal manager 925 is capable of, configured to, or operable to support a means for receiving, from a network entity, control signaling indicating an OCC codeword assigned to the UE and an OCC factor. The uplink grant manager 930 is capable of, configured to, or operable to support a means for receiving an uplink grant allocating uplink resources over a series of uplink time units for a quantity of repetitions of a transmission block. The uplink transmission manager 935 is capable of, configured to, or operable to support a means for transmitting, using the assigned OCC codeword, each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor.

In some examples, the capability manager 940 is capable of, configured to, or operable to support a means for transmitting, to the network entity, a capability report indicating a capability of the UE to support TBoMS with OCC.

In some examples, the OCC codeword is a first OCC codeword of a set of multiple OCC codewords. In some examples, the set of multiple OCC codewords are assigned to a set of multiple UEs associated with the network entity.

In some examples, the uplink time unit manager 945 is capable of, configured to, or operable to support a means for receiving, from the network entity, an indication of a quantity of uplink time units for OCC, where the quantity of uplink time units for OCC is a function of the OCC factor and the quantity of uplink time units.

In some examples, a function of the quantity of uplink time units for OCC and the quantity of repetitions is less than or equal to a quotient of a value of the threshold and the OCC factor.

In some examples, the quantity of uplink time units for OCC and the OCC factor are each based on a time-domain resource (TDRA) mapping table indicating a mapping between PUSCH mapping type, a starting symbol, a symbol length, a quantity of repetitions, a quantity of slots spanning each repetition, or any combination thereof.

In some examples, the quantity of uplink time units is greater than or equal to the OCC factor. In some examples, the OCC factor is a factor of the quantity of uplink time units.

In some examples, the series of uplink time units include a series of uplink time slots.

In some examples, the series of time units include a series of resource units for uplink NB-IoT.

In some examples, each repetition of the transmission block over the quantity of uplink time units includes a single TBoMS transmission.

In some cases, the control signal manager 925, the uplink grant manager 930, the uplink transmission manager 935, the capability manager 940, and the uplink time unit manager 945 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signal manager 925, the uplink grant manager 930, the uplink transmission manager 935, the capability manager 940, and the uplink time unit manager 945 discussed herein.

Figure 10:
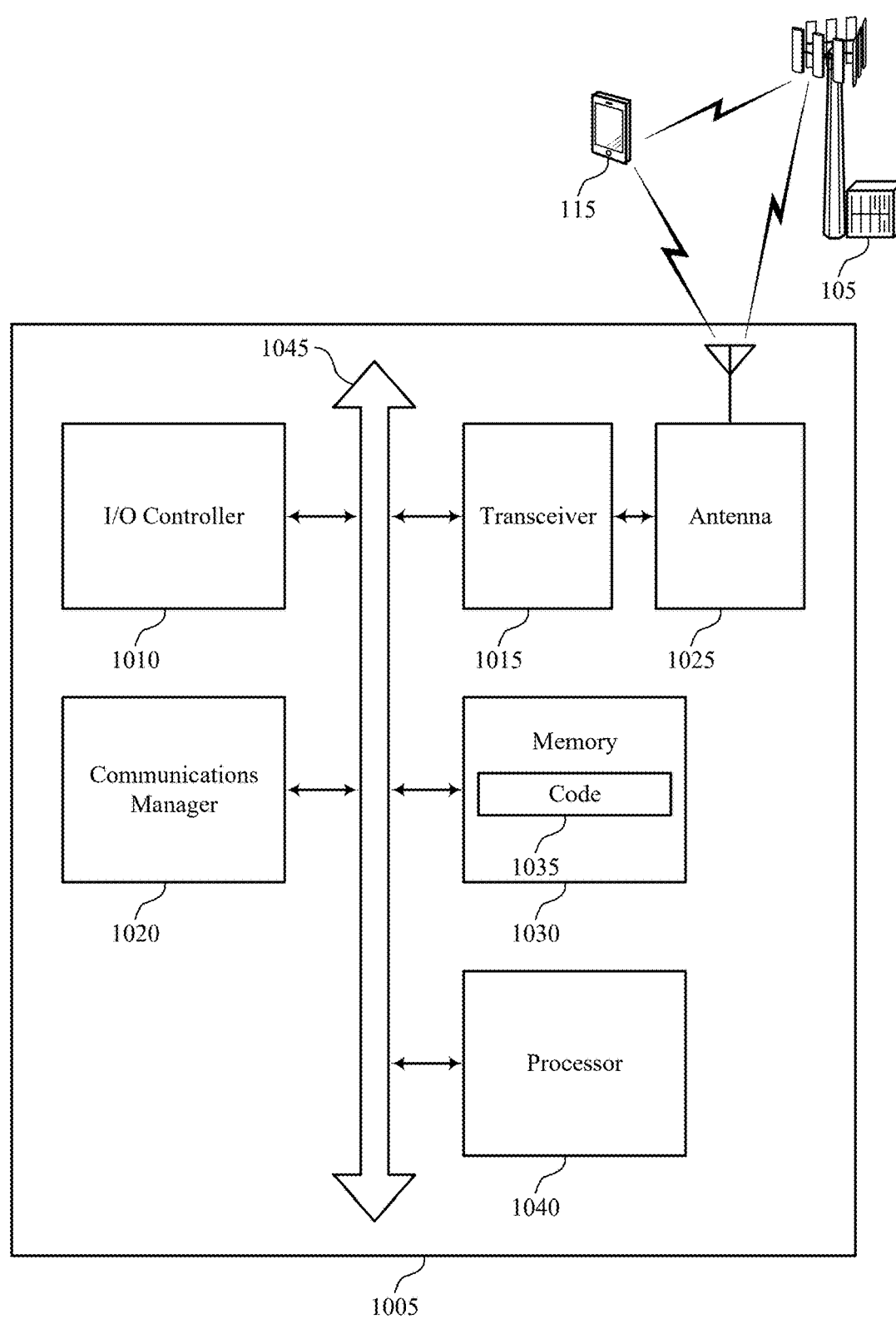
FIG. 10 shows a diagram of a system including a device that supports techniques for OCC with TBoMS and RU allocation in accordance with one or more aspects of the present disclosure.

FIG. 10 shows a diagram of a system 1000 including a device 1005 that supports techniques for OCC with TBoMS and RU allocation in accordance with one or more aspects of the present disclosure. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting techniques for OCC with TBoMS and RU allocation). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for receiving, from a network entity, control signaling indicating an OCC codeword assigned to the UE and an OCC factor. The communications manager 1020 is capable of, configured to, or operable to support a means for receiving an uplink grant allocating uplink resources over a series of uplink time units for a quantity of repetitions of a transmission block. The communications manager 1020 is capable of, configured to, or operable to support a means for transmitting, using the assigned OCC codeword, each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor.

By including or configuring the communications manager 1020 in accordance with examples as described herein, the device 1005 may support techniques for improved communication reliability and more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of techniques for OCC with TBoMS and RU allocation as described herein, or the at least one processor 1040 and the at least one memory 1030 may be otherwise configured to, individually or collectively, perform or support such operations.

FIG. 11 shows a flowchart illustrating a method 1100 that supports techniques for OCC with TBoMS and RU allocation in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving, from a network entity, control signaling indicating an OCC codeword assigned to the UE and an OCC factor. The operations of 1105 may be performed in accordance with examples as disclosed herein. In some examples, aspects of the operations of 1105 may be performed by a control signal manager 925 as described with reference to FIG. 9.

At 1110, the method may include receiving an uplink grant allocating uplink resources over a series of uplink time units for a quantity of repetitions of a transmission block. The operations of 1110 may be performed in accordance with examples as disclosed herein. In some examples, aspects of the operations of 1110 may be performed by an uplink grant manager 930 as described with reference to FIG. 9.

At 1115, the method may include transmitting, using the assigned OCC codeword, each repetition of the quantity of repetitions of the transmission block over a quantity of uplink time units of the series of uplink time units, where a function of the quantity of uplink time units and the quantity of repetitions satisfies a threshold, and where the quantity of uplink time units is greater than or equal to the OCC factor. The operations of 1115 may be performed in accordance with examples as disclosed herein. In some examples, aspects of the operations of 1115 may be performed by an uplink transmission manager 935 as described with reference to FIG. 9.

The following provides an overview of aspects of the present disclosure:

Aspect 1: A method for wireless communications by a UE, comprising: receiving, from a network entity, control signaling indicating an OCC codeword assigned to the UE and an OCC factor; receiving an uplink grant allocating uplink resources over a series of uplink time units for a quantity of repetitions of a transmission block; and transmitting, using the assigned OCC codeword, each repetition of the quantity of repetitions of the transmission block over a quantity of uplink time units of the series of uplink time units, wherein a function of the quantity of uplink time units and the quantity of repetitions satisfies a threshold, and wherein the quantity of uplink time units is greater than or equal to the OCC factor.

Aspect 2: The method of aspect 1, further comprising: transmitting, to the network entity, a capability report indicating a capability of the UE to support transmission blocks over multiple slots (TBoMS) with OCC.

Aspect 3: The method of any of aspects 1 through 2, wherein the OCC codeword is a first OCC codeword of a plurality of OCC codewords, and the plurality of OCC codewords are assigned to a plurality of UEs associated with the network entity.

Aspect 4: The method of any of aspects 1 through 3, further comprising: receiving, from the network entity, an indication of a quantity of uplink time units for OCC, wherein the quantity of uplink time units for OCC is a function of the OCC factor and the quantity of uplink time units.

Aspect 5: The method of aspect 4, wherein a function of the quantity of uplink time units for OCC and the quantity of repetitions is less than or equal to a quotient of a value of the threshold and the OCC factor.

Aspect 6: The method of any of aspects 4 through 5, wherein the quantity of uplink time units for OCC and the OCC factor are each based at least in part on a TDRA mapping table indicating a mapping between PUSCH mapping type, a starting symbol, a symbol length, a quantity of repetitions, a quantity of slots spanning each repetition, or any combination thereof.

Aspect 7: The method of any of aspects 1 through 6, wherein the quantity of uplink time units is greater than or equal to the OCC factor, and the OCC factor is a factor of the quantity of uplink time units.

Aspect 8: The method of any of aspects 1 through 7, wherein the series of uplink time units comprise a series of uplink time slots.

Aspect 9: The method of any of aspects 1 through 8, wherein the series of time units comprise a series of resource units for uplink NB-IoT.

Aspect 10: The method of any of aspects 1 through 9, wherein each repetition of the transmission block over the quantity of uplink time units comprises a single TBoMS transmission.

Aspect 11: A UE for wireless communications, comprising one or more memories storing processor-executable code, and one or more processors coupled with the one or more memories and individually or collectively operable to execute the code to cause the UE to perform a method of any of aspects 1 through 10.

Aspect 12: A UE for wireless communications, comprising at least one means for performing a method of any of aspects 1 through 10.

Aspect 13: A non-transitory computer-readable medium storing code for wireless communications, the code comprising instructions executable by one or more processors to perform a method of any of aspects 1 through 10.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns.

Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories, wherein the one or more processors are individually or collectively configured to cause the UE to:

receive, from a network entity, control signaling indicating an orthogonal cover coding (OCC) codeword assigned to the UE and an OCC factor;

receive an uplink grant allocating uplink resources over a series of uplink time units for a quantity of repetitions of a transmission block; and transmit, using the OCC codeword, each repetition of the quantity of repetitions of the transmission block over a quantity of uplink time units of the series of uplink time units, wherein a function of the quantity of uplink time units and the quantity of repetitions satisfies a threshold, and wherein the quantity of uplink time units is greater than or equal to the OCC factor.

2. The UE of claim 1, wherein the one or more processors are individually or collectively further configured to cause the UE to:

transmit, to the network entity, a capability report indicating a capability of the UE to support transmission blocks over multiple slots (TBoMS) with OCC.

3. The UE of claim 1, wherein:

the OCC codeword is a first OCC codeword of a plurality of OCC codewords, and the plurality of OCC codewords are assigned to a plurality of UEs associated with the network entity.

4. The UE of claim 1, wherein the one or more processors are individually or collectively further configured to cause the UE to:

receive, from the network entity, an indication of a quantity of uplink time units for OCC, wherein the quantity of uplink time units for OCC is a function of the OCC factor and the quantity of uplink time units.

5. The UE of claim 4, wherein a function of the quantity of uplink time units for OCC and the quantity of repetitions is less than or equal to a quotient of a value of the threshold and the OCC factor.

6. The UE of claim 4, wherein the quantity of uplink time units for OCC and the OCC factor are each based at least in part on a time-domain resource (TDRA) mapping table indicating a mapping between physical uplink shared channel (PUSCH) mapping type, a starting symbol, a symbol length, a quantity of repetitions, a quantity of slots spanning each repetition, or any combination thereof.

7. The UE of claim 1, wherein:

the quantity of uplink time units is greater than or equal to the OCC factor, and the OCC factor is a factor of the quantity of uplink time units.

8. The UE of claim 1, wherein the series of uplink time units comprise a series of uplink time slots.

9. The UE of claim 1, wherein the series of time units comprise a series of resource units for uplink narrow band-Internet of Things (NB-IOT).

10. The UE of claim 1, wherein each repetition of the transmission block over the quantity of uplink time units comprises a single transmission block over multiple slots (TBoMS) transmission.

11. A method for wireless communications by a user equipment (UE), comprising:

receiving, from a network entity, control signaling indicating an orthogonal cover coding (OCC) codeword assigned to the UE and an OCC factor;

receiving an uplink grant allocating uplink resources over a series of uplink time units for a quantity of repetitions of a transmission block; and transmitting, using the OCC codeword, each repetition of the quantity of repetitions of the transmission block over a quantity of uplink time units of the series of uplink time units, wherein a function of the quantity of uplink time units and the quantity of repetitions satisfies a threshold, and wherein the quantity of uplink time units is greater than or equal to the OCC factor.

12. The method of claim 11, further comprising:

transmitting, to the network entity, a capability report indicating a capability of the UE to support transmission blocks over multiple slots (TBoMS) with OCC.

13. The method of claim 11, wherein:

the OCC codeword is a first OCC codeword of a plurality of OCC codewords, and the plurality of OCC codewords are assigned to a plurality of UEs associated with the network entity.

14. The method of claim 11, further comprising:

receiving, from the network entity, an indication of a quantity of uplink time units for OCC, wherein the quantity of uplink time units for OCC is a function of the OCC factor and the quantity of uplink time units.

15. The method of claim 14, wherein a function of the quantity of uplink time units for OCC and the quantity of repetitions is less than or equal to a quotient of a value of the threshold and the OCC factor.

16. The method of claim 14, wherein the quantity of uplink time units for OCC and the OCC factor are each based at least in part on a time-domain resource (TDRA) mapping table indicating a mapping between physical uplink shared channel (PUSCH) mapping type, a starting symbol, a symbol length, a quantity of repetitions, a quantity of slots spanning each repetition, or any combination thereof.

17. The method of claim 11, wherein:

the quantity of uplink time units is greater than or equal to the OCC factor, and the OCC factor is a factor of the quantity of uplink time units.

18. The method of claim 11, wherein the series of uplink time units comprise a series of uplink time slots or a series of resource units for uplink narrow band-Internet of Things (NB-IOT).

19. A non-transitory computer-readable medium storing code for wireless communications, the code comprising instructions executable by one or more processors of a user equipment (UE) to:

receive, from a network entity, control signaling indicating an orthogonal cover coding (OCC) codeword assigned to the UE and an OCC factor;

receive an uplink grant allocating uplink resources over a series of uplink time units for a quantity of repetitions of a transmission block; and transmit, using the OCC codeword, each repetition of the quantity of repetitions of the transmission block over a quantity of uplink time units of the series of uplink time units, wherein a function of the quantity of uplink time units and the quantity of repetitions satisfies a threshold, and wherein the quantity of uplink time units is greater than or equal to the OCC factor.

20. The non-transitory computer-readable medium of claim 19, wherein the instructions are further executable by the one or more processors to:

transmit, to the network entity, a capability report indicating a capability of the UE to support transmission blocks over multiple slots (TBoMS) with OCC.

* * * * *